United States Patent [19]

Jang et al.

[11] Patent Number: 5,936,861
[45] Date of Patent: Aug. 10, 1999

[54] APPARATUS AND PROCESS FOR PRODUCING FIBER REINFORCED COMPOSITE OBJECTS

[75] Inventors: Bor Z. Jang; Erjian Ma; C. Jeff Wang, all of Auburn, Ala.

[73] Assignee: Nanotek Instruments, Inc., Opelika, Ala.

[21] Appl. No.: 08/911,227

[22] Filed: Aug. 15, 1997

[51] Int. Cl.$^6$ .............................. G06F 19/00; G06G 7/66
[52] U.S. Cl. ............................... 364/468.04; 364/468.02; 364/468.15; 364/474.05
[58] Field of Search .................. 364/468.04, 468.02, 364/408.04, 468.15, 468.16, 468.25, 468.26, 468.27, 474.05; 345/139, 418, 419, 420; 359/548; 382/154

[56] References Cited

U.S. PATENT DOCUMENTS

| | | | |
|---|---|---|---|
| 4,665,492 | 5/1987 | Masters | 364/468 |
| 4,752,498 | 6/1988 | Fudim | 427/54.1 |
| 4,801,477 | 1/1989 | Fudim | 427/54.1 |
| 4,818,562 | 4/1989 | Arcella et al. | 427/53.1 |
| 5,071,503 | 12/1991 | Berman | 156/250 |
| 5,121,329 | 6/1992 | Crump | 364/468 |
| 5,156,700 | 10/1992 | Berman et al. | 156/155 |
| 5,301,863 | 4/1994 | Prinz et al. | 228/33 |
| 5,398,193 | 3/1995 | DeAngelis | 364/468 |
| 5,432,704 | 7/1995 | Vouzelaud et al. | 364/474.24 |
| 5,481,465 | 1/1996 | Ioth et al. | 364/468 |
| 5,514,232 | 5/1996 | Burns | 156/64 |
| 5,590,454 | 1/1997 | Rickhardson | 29/27.4 |
| 5,594,652 | 1/1997 | Penn et al. | 364/468.26 |
| 5,637,175 | 6/1997 | Feygin et al. | 156/264 |
| 5,681,513 | 10/1997 | Farley | 264/102 |
| 5,705,008 | 1/1998 | Hecht | 156/148 |
| 5,718,951 | 2/1998 | Sterett et al. | 427/466 |

OTHER PUBLICATIONS

L.E. Weiss, "Solid Freeform Fabrication Processes" in Proc. of NSF Workshop on Design Methodologies for Solid Free Form Fabrication, Jun. 5–6, 1995.

*Primary Examiner*—Paul P. Gordon
*Assistant Examiner*—Ramesh Patel

[57] ABSTRACT

A process and apparatus for making three-dimensional, composite material objects of a predetermined shape by sequentially depositing multiple layers of continuous reinforcement fibers and solidifying matrix material on a base member in a desired pattern. The apparatus comprises (a) a movable nozzle having a flow passage and a dispensing outlet, (b) a supply of reinforcement fibers and a matrix material, a mixing device for impregnating the fibers with a matrix material to form a preimpregnated tow, and a heating device for introducing the matrix material in a fluid state, (c) a base member to support the object being made, (d) mechanical movement devices for moving the base member relative to the movable nozzle in a predetermined sequence and pattern, and for displacing the movable nozzle a predetermined incremental distance relative to the base member and relative to each successive layer deposited prior to the start of the formation of each successive layer to form multiple layers of composite material of a predetermined thickness, and (e) a metering device for discharging the preimpregnated tow at a predetermined rate onto the base member. The apparatus preferably further comprises (f) a computer-aided design computer and supporting software programs that are capable of creating a three-dimensional drawing of a desired object and converting the drawing into multiple elevation layer data, and (g) a three-dimensional motion controller electronically linked to the mechanical movement devices and operative to actuate these movement devices in response to the drive signals received from the computer.

24 Claims, 9 Drawing Sheets

APPARATUS AND PROCESS FOR PRODUCING FIBER REINFORCED COMPOSITE OBJECTS

FIELD OF THE INVENTION

This invention relates generally to an improved process and apparatus for production of three-dimensional objects composed of continuous fiber reinforced composite materials. More specifically, it relates to a process and apparatus for forming a three-dimensional composite object in an essentially layer-by-layer manner.

BACKGROUND OF THE INVENTION

Several new manufacturing processes, commonly referred to as solid free form fabrication (SFF), have recently emerged to build parts point-by-point and layer-by-layer. These processes were originally developed for use as a shortcut to making models, molds and dies, and prototype parts. These technologies entail the production of freeform solid objects directly from a computer-created model without part-specific tooling or human intervention. Solid free form fabrication also has potential as a cost-effective production process if the number of parts needed at a given time is relatively small. Use of SFF could reduce tool-making time and cost, and provide the opportunity to modify tool design without incurring high costs and lengthy time delays. A SFF process can be used to fabricate certain parts with a complex geometry which otherwise could not be practically made by traditional fabrication approaches such as machining. The reference book written by P. F. Jacobs (entitled "Rapid Prototyping and Manufacturing: Fundamentals of Stereo Lithography," McGraw Hill Pub. New York, 1992) provides a good overview on various SFF methods.

The SFF technology has three levels of sophistication: The first is the ability to generate models or prototypes that clearly show the part design concept in three dimensions. All SFF techniques developed so far (e.g., stereo lithography, selective laser sintering, solid ground curing, 3-D printing, laminated object manufacturing, fused deposition modeling, and recursive masking and depositing, etc.) are capable of creating such models. The second level is the ability to produce parts that have acceptable dimensions and tolerances, and sufficient strength for preliminary evaluation in a simulated service environment. Although some progress has been made in attempting to achieve this ability, the parts produced with no fiber reinforcement or with only short fibers, remain to be of inadequate structural integrity.

The third level is the ability to produce parts having high structural integrity and good dimensional tolerances so that they can be placed in real operating systems. Little has been done toward fabricating SFF parts with high structural integrity. Some preliminary attempts have been made to use stereo lithography based techniques to fabricate both short and continuous fiber reinforced, UV-curable resins. In most cases, only composites with excessively low volume fractions of fibers were obtained and, hence, the resulting composites have exhibited low strength and stiffness. Furthermore, in such stereo lithography based techniques, only a laser- or UV-curable resin can be employed as the matrix material for a composite.

Fiber reinforced composites are known to have great stiffness, strength, damage tolerance, fatigue resistance, and corrosion resistance. However, currently available SFF technologies, in their present forms, do not lend themselves to the production of continuous fiber composite parts. We have discovered that selected SFF approaches (such as fused deposition modeling) could be modified and integrated with textile structure-forming operations (such as selected steps in braiding, weaving, stitching, and knitting) to produce parts on an essentially layer-by-layer basis. The parts produced by such a combination of SFF and textile operations, being of continuous fiber reinforced composite, are of superior structural integrity. The new processes represent a major step forward toward achieving the highest level of sophistication in SFF. They would likely become competitive, preferred, or possibly the only approaches for fabricating certain composite parts of a complex geometry.

Fused Deposition Modeling (FDM) and Shape Deposition Manufacturing (SDM) are two relatively flexible and versatile SFF approaches. In the conventional FDM (e.g. S. S. Crump, U.S. Pat. No. 5,121,329 (1992)), a continuous filament of a solid thermoplastic polymer, wax, or metal is heated to become liquid and extruded through a nozzle, which deposits the liquid on a base member. The relative motions along the "X"-axis and "Y"-axis between the nozzle and the base member is computer-controlled to trace out the cross sections of a part on a layer-by-layer basis. The material is heated to only slightly above the melting point, so that solidification occurs within seconds after exiting the nozzle.

In the SDM technology that is under active development, material deposition and material removal processes are integrated to build an object. Layer segments are deposited as near-net shapes and then machined to net-shape before additional material is deposited. This method was included in the discussion of an article written by L. E. Weiss ("Solid Freeform Fabrication Processes," in the Proc. of NSF Workshop on Design Methodologies for Solid Freeform Fabrication," Jun. 5–6, 1995, Pittsburgh, Pa.). Both FDM and SDM typically involve building a prototype part with a neat material, such as a resin or metal, without any fiber reinforcement. No prior art has been reported on building continuous fiber reinforced parts using a FDM- or SDM-based technology.

Numerous prior art methods are being practiced to produce continuous fiber reinforced composites. All of these methods have disadvantages or shortcomings. For example, the hand lay-up process is labor-intensive and the quality of the resulting composite part depends highly upon the skills of an operator. The combined process of prepreg preparation, cutting, lay-up, vacuum bagging, and autoclave or press curing is notoriously tedious, lengthy, and energy-intensive. In resin transfer molding (RTM), a dry reinforcement material, originally in the forms of roving, mat, fabric, or a combination, is cut and shaped into a preform. The preform is then pre-rigidized by using a small amount of fast-curing resin to hold its shape during the subsequent operations. The preform is then placed in a mold, the mold is closed and resin is then injected into it. Resin must flow through the small channels inside a normally tightly-configured preform, expelling the air in the mold cavity, impregnating the preform and wetting out the fibers. The RTM process suffers from several drawbacks. First, it requires execution of two separate processes: preform preparation and resin impregnation. Complete impregnation of a dense or large-sized preform by a viscous resin can be very difficult. Second, it requires utilization of a mold, which is normally quite costly. Third, RTM is not suitable for fabricating complex-shaped parts (e.g. part with a hollow cavity).

Processes such as filament winding and pultrusion can be highly automated. However, filament winding is essentially limited to fabrication of convex-shaped hollow structures such as pressure vessels. Pultrusion can produce a variety of reinforced solid, tubular, or structural profiles. Unfortunately, these structures are essentially limited to be of a constant cross-section. Both filament winding and protrusion are not well-suited to production of complex-shaped parts. An overview of various composite processing techniques is given in a reference book written by one of us (B. Z. Jang, "Advanced Polymer Composites: Principles and Applications," ASM International, Materials Park, Ohio, December 1994).

In summary, currently available SFF technologies, generally speaking, do not lend themselves to the production of continuous fiber composite parts. In general, current composite processing techniques are not capable of producing parts of a complex geometry, or producing parts of a specified geometry directly from a computer-aided design. Accordingly, it is desirable to develop a process and apparatus that can be used to fabricate continuous fiber reinforced composite parts of high structural integrity and complex geometry. It is further desirable that the process also has the capability of producing a three-dimensional object automatically in response to the computer-aided design of the object.

OBJECTS OF THE INVENTION

Therefore, an object of the present invention is to provide a process and apparatus wherein a three-dimensional object can be constructed from resin- or metal-impregnated continuous fibers in an essentially layer-by-layer manner.

Another object of the present invention is to provide a process and apparatus that can automatically reproduce a three-dimensional object which has been designed by the aid of a computer from the data file of the computer.

BRIEF SUMMARY OF THE INVENTION

The present invention provides a process and apparatus by means which the nozzle tracing motions, commonly used in FDM or SDM, can be integrated with proper fiber movement and fiber-matrix mixing operations to build complex-geometry composite parts essentially layer-by-layer. Such a SFF-based technology can be employed as a cost-effective way of producing tools and molds that are composed of continuous fiber reinforced composites. Advanced fiber reinforced polymer and metal matrix composites normally have great specific stiffness (modulus-to-density ratio), specific strength (strength-to-density ratio), creep and fatigue resistance, and fracture toughness. A prototype part or tool made from an advanced composite will be of superior structural integrity and durability. Further, composite mechanics and design approaches have advanced to the status that, by judiciously selecting fibers (some having a negative coefficient of thermal expansion, CTE, in the axial direction) and their orientations, one can readily produce composites with a desired CTE (e.g. zero CTE). Zero-CTE materials such as INVAR have been shown to meet thermal and durability requirements and are used in current aircraft production programs. INVAR tooling, however, is very expensive and requires a long fabrication lead time. The presently invented technology will permit cost-effective, rapid fabrication of durable tools, which themselves are made from continuous fiber composites with thermal characteristics that are compatible with those of the intended composite parts.

The present invention also provides more realistic prototyping. In the cases where the production part is composite material-based, a prototype part being similar in both composition and microstructure to the production part can be fully evaluated to verify its fit-function-form before mass production begins. This could help eliminate the possibility of producing a large number of parts only to find out that these parts do not meet the requirements.

The present invention further provides a potentially cost-effective composite fabrication process. Most of the current composite processing techniques are not capable of manufacturing structural parts of a complex geometry. SFF concepts provide effective approaches to the production of complex composite structures. This new technology will permit the production of custom manufactured parts and tools on demand. Cost-effective processing techniques will significantly broaden the scope of application for composites.

These objectives are realized by dispensing a mixture of reinforcement fibers and a matrix material at a controlled rate from a dispensing head onto a substrate or base member. The dispensing motion is carried out in a predetermined pattern that is dictated by the shape of an object to be formed. Both constituent materials, reinforcement fibers and matrix, are dispensed in multiple layers which solidify and adhere to each other to build up the object. The process is controlled so that the material in the preceding layer, and in particular at least the material under the dispensing head, has a sufficient self-supporting strength and rigidity before additional material is applied on top of it to form a subsequent layer.

Preferably, the reinforcement fibers, typically in a multiple-filament tow form, are well impregnated with the matrix material prior to being deposited onto the base member or the preceding layers. To obtain a smoother surface, a tow of fewer filaments, may be selected. Advantageously, the impregnated tow is controlled so that the matrix material is maintained in a fluid state to facilitate adhering to the preceding layers to form a multi-layered structure (a laminate). Optionally, more than one dispensing head can be used in one system. Different dispensing heads can be controlled to deposit impregnated tows of different fiber types or different filament counts. One of the dispensing heads can be selected to deposit only the matrix material, without the reinforcement. This matrix material-dispensing head can be employed (1) to build the portion of a part where fiber reinforcement is not needed, (2) to form neat matrix (metal or resin) layers with a complex surface profile where needed, and (3) to smooth out a fiber-covered layer with a resin or metal for improved surface finish.

The dispensing head can be controlled to elevate along a "Z" axis (vertical) so as to sequentially form layers of a desired thickness. The thickness of an individual layer is controlled primarily by two factors: the size of the impregnated tow and the regulated gap between the dispensing head and the previously-formed layer.

Drive means such as electric motors are provided to selectively move the base member and dispensing head relative to each other in a predetermined pattern along "X" and "Y" axes as material is being dispensed to form each successive layer. As desired, relative vertical movements along the "Z" axis may also be carried out during the formation of each layer, as well as at the completion of each layer to achieve a desired layer shape (surface profile) and thickness. These vertical movements can be controlled to provide Z-axis reinforcement fibers so that the strength and stiffness of a composite in the Z-direction can be significantly improved. This would help reduce or eliminate inter-layer delamination, the most commonly found life-limiting problem in a traditional composite laminate. The capability of incorporating fibers in a third direction provides an added dimension in tailoring the properties of a composite.

Such mechanical movements are preferably achieved through drive signals inputted to the drive motors for the base member and the dispensing head from a computer or controller supported by a computer-aided design/computer-aided manufacturing system. Such a CAD/CAM system contains commercially available software to design and create the object to be formed. Specifically, the software is utilized to convert the three-dimensional shape of an intended object into multiple layer data, which is transmitted as drive signals through a controller to the drive motors. Each individual computer-generated layer can have its own shape and thickness. It is the combination and consolidation of these layers that form the complete shape of the object.

Depending upon the type and form of the starting matrix material, a different method is employed to supply the reinforcement fibers and matrix material to the dispensing head and to, preferably, facilitate impregnation of the fiber tow with the matrix material prior to deposition. For a fiber reinforced thermoset resin composite article, for instance, a continuous strand roving (tow) may be pulled from a spool into a resin bath that contains a liquid resin, curing agents, and other ingredients (such as colorant, ultraviolet stabilizer, and fire retardant). Advantageously, the fiber-resin stream is pulled through a series of rollers, which act to guide the movement of the stream, promote resin impregnation into the fiber tow, and squeeze out the excess resin. The impregnated tow (hereinafter referred to as "towpreg") is driven to go through a flow-passage of a nozzle and eventually exit from the orifice of the nozzle to deposit onto the previously formed layer. A heating provision is attached to, or contained in, the nozzle to control the advancement of curing reactions so that the resin will have sufficient viscosity or rigidity to avoid excessive spreading upon deposition on the previous layer. Preferably, the resin chemistry is controlled so that the resin substantially "solidifies" soon after dispensing.

Thermoplastic and metal matrix composite articles can also be made in a similar fashion with some modifications to the process. For instance, the fiber tow may be pulled through a resin bath that contains either a thermoplastic melt or thermoplastic-solvent solution. The resin-fiber stream is then driven through a series of roller to promote resin impregnation and fiber wet-out, and to remove the solvent (if present). The impregnated tow (towpreg) then goes through a nozzle with heating means and temperature controller to closely regulate the temperature of the thermoplastic resin to be slightly above the solidification temperature at the point of discharge. Metal matrix composites can be similarly processed provided an inert atmosphere is introduced to prevent metal oxidation.

These and other objects and advantages of the invention will become readily apparent as one reads through the following description of preferred embodiments and the accompanying drawings.

DESCRIPTION OF THE PREFERRED EMBODIMENTS

Figure 1:
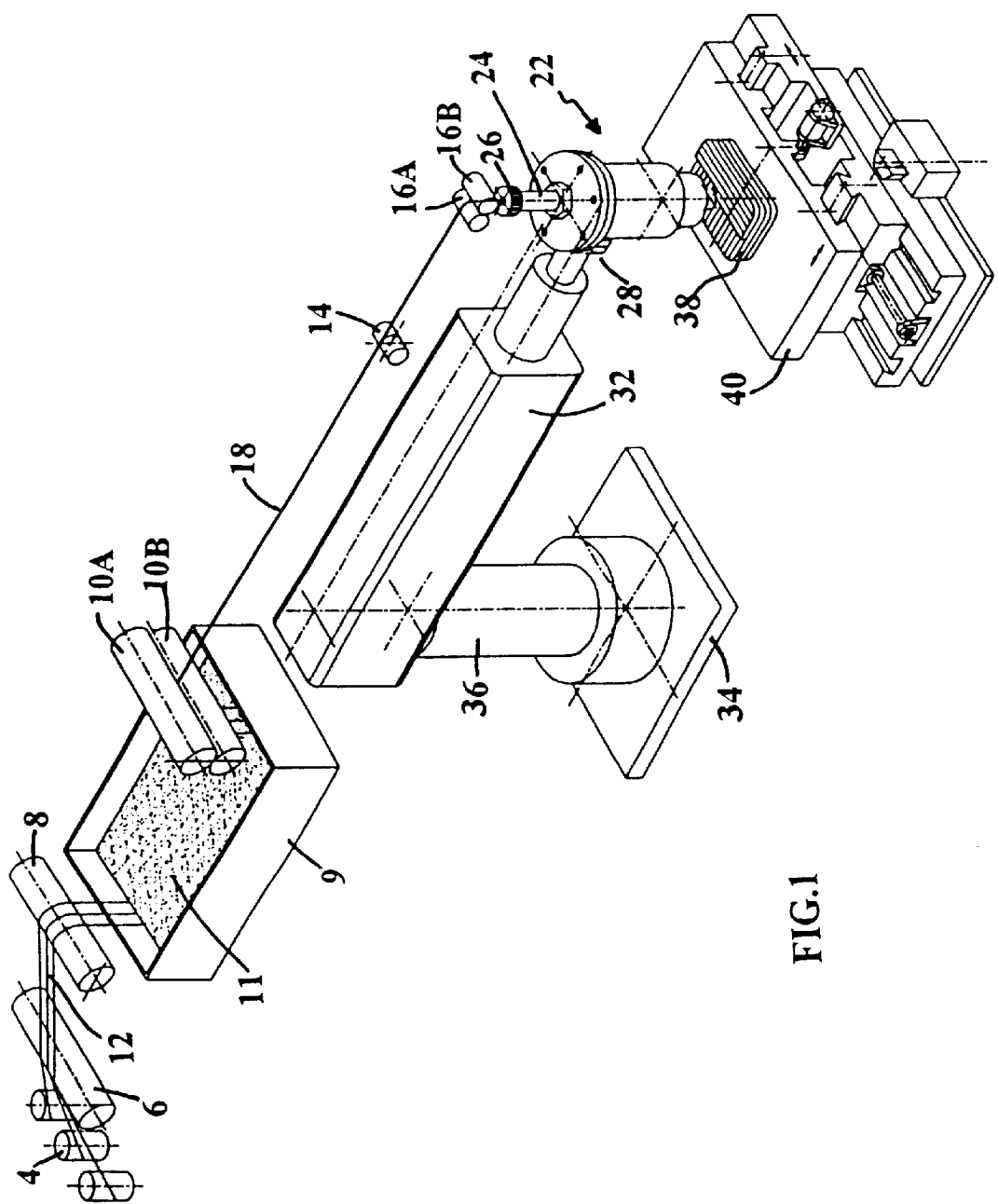
FIG. 1 An example of apparatus for making three-dimensional (3-D) objects from advanced fiber composite materials.
Figure 2:
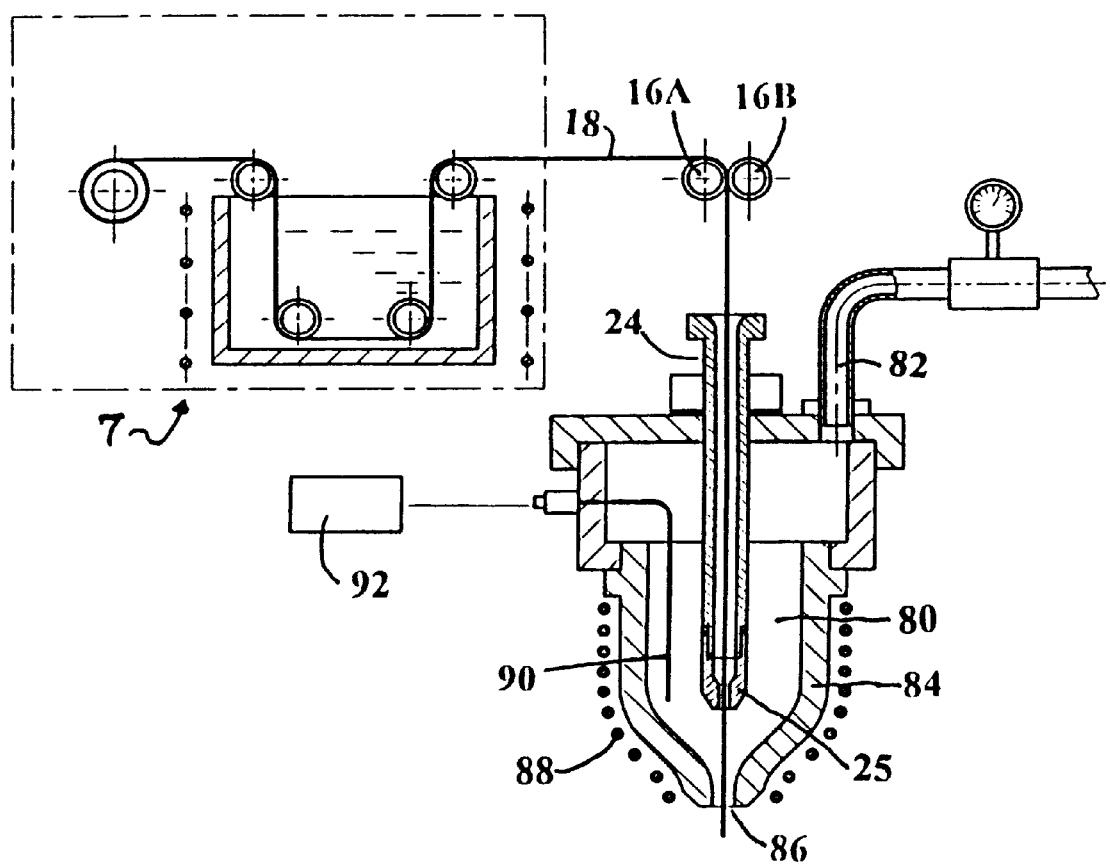
FIG. 2 A sectional view of a possible nozzle design.

FIG. 1 illustrates one embodiment of the apparatus of this invention for making three-dimensional objects that are primarily composed of continuous fiber reinforced polymer- or metal-matrix composite materials. This apparatus begins with a supply of reinforcement fibers and a matrix material, plus means for mixing said reinforcement fibers and matrix material to form a continuous tow of impregnated fibers. To make a fiber reinforced thermoset resin composite article, for instance, a continuous strand roving of fibers may be pulled from a fiber spool 4, or a plurality of spools supplying multiple strands that are merged into one tow 12. The tow is directed to submerge into a resin bath 9 that contains a liquid mixture 11 of a resin, curing agent and, as needed, other ingredients such as colorant, ultraviolet stabilizer, and fire retardant. Advantageously, the fiber tow is pulled through a series of roller means 6,8,10A,10B,14,16A,16B, which act to guide the movement of the tow, promote resin impregnation into the fiber tow, and squeeze out the excess resin. This step produces a continuous supply of a resin-impregnated tow 18. The fiber tow-impregnating system (including rollers, resin bath, and optional heating means) is schematically shown in FIG. 2 and collectively represented by a numeral 7.

Preferably, selected rollers are equipped with motor means to help drive the movement of the fiber tow. The impregnated tow is driven to enter one end 26 of a moveable head (a nozzle 22) having flow-passage means therein. FIG. 2 shows a sectional view of a possible nozzle design. The flow passage means advantageously comprises a hollow guiding rod (a tube 24) to direct the movement of the impregnated tow. This guiding tube preferably has a changeable tip 25 at its opposite end. This tube is partially enclosed in a temperature-controlled region of the nozzle. The bottom part of the nozzle has a small cell 80 to optionally accept additional matrix material (if necessary) that is transported through an opening 82 from an extrusion or resin transfer device. The flow pattern and pressure in this cell are designed to provide additional dragging force to assist in "extruding" the softened towpreg out of the nozzle for deposition. Preferably, the changeable tip 25 of the guiding tube is designed so that it acts as a check valve to prevent back flow of liquid from said cell to the guiding tube 24.

Figure 3:
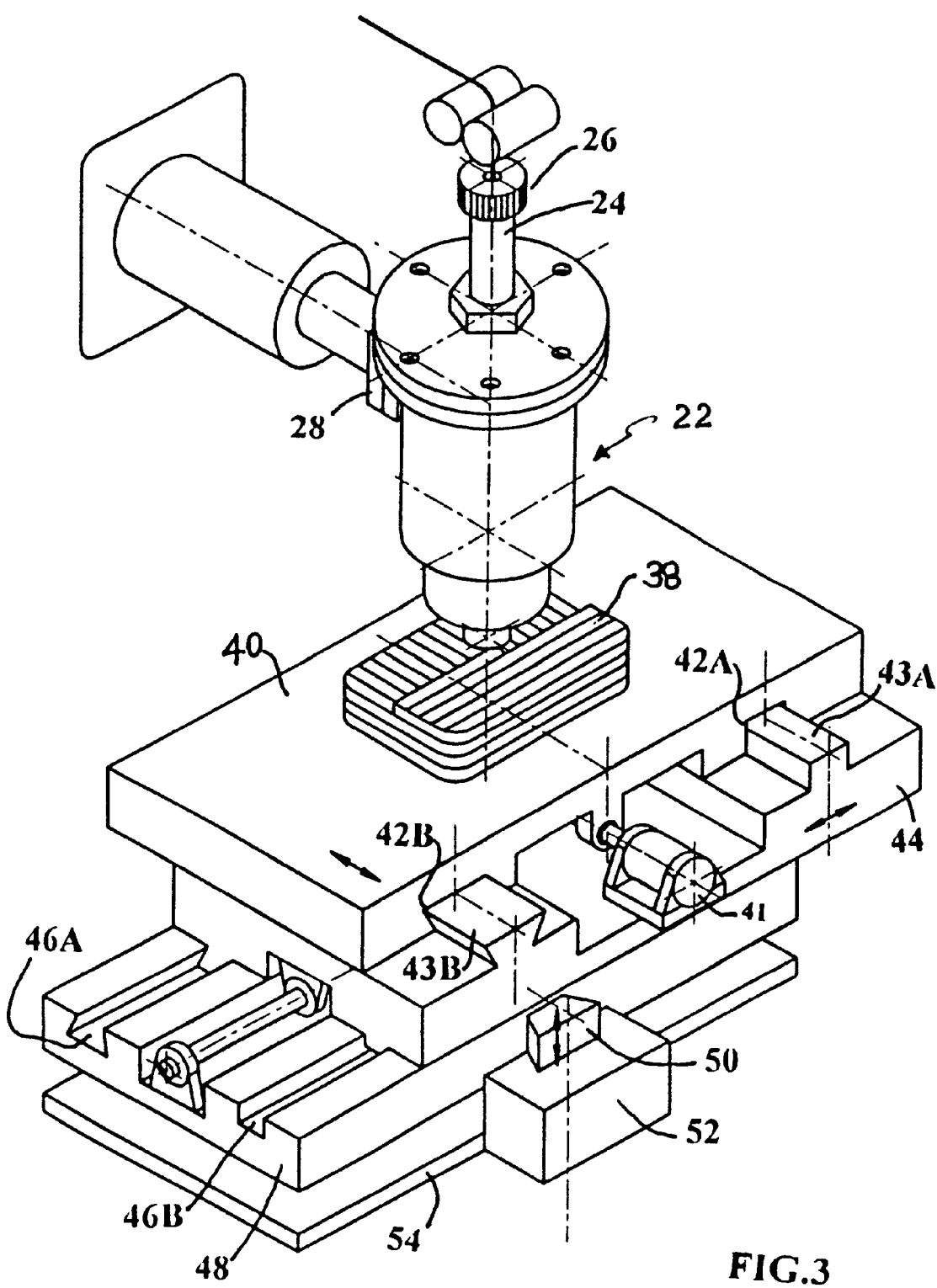
FIG. 3 A perspective view of the nozzle-base member portion of the apparatus shown in FIG. 1.

Connected to the opposite end of the nozzle is a dispensing outlet 84 comprising a tip with a discharge orifice 86 of predetermined size. The impregnated tow goes through a passage 24 of the nozzle and eventually exits from the orifice 86 of the nozzle to deposit onto either a base member 40 or a previously formed layer (e.g. top layer of an object 38 being formed) on the base member (FIGS. 1 and 3). Further referring to FIG. 2, a heating provision (heating elements 88) is attached to, or contained in, the nozzle to control the advancement of curing reactions so that the resin will have sufficient viscosity or rigidity to avoid excessive spreading upon deposition onto a previous layer. A temperature sensing means (e.g. a thermocouple 90) and a temperature controller 92 can be employed to regulate the temperature of the nozzle. Further preferably, the resin chemistry is controlled so that the resin substantially "solidifies" soon after dispensing. Fast-curing thermosetting resins are commercially available. Optionally, a separate heating device can be utilized to accelerate the curing process of the deposited layers.

Advantageously, the dispensing outlet 84 may be designed so that the tip can be readily removed and replaced with another tip with a discharge orifice of a different size. Such an adjustable tip is desirable because an operator may choose to use different tow sizes or different fibers to build different components.

Referring again to FIG. 3, the base member 40 is located in close, working proximity to the dispensing outlet of the movable head (the nozzle 22). The upper surface of the base member 40 preferably has a flat region sufficiently large to accommodate the first few layers of impregnated tow. The base member and the nozzle are equipped with mechanical drive means for moving the base member relative to the movable head in three dimensions along "X," "Y," and "Z" axes in a rectangular coordinate system in a predetermined sequence and pattern, and for displacing the nozzle a predetermined incremental distance relative to the base member. This can be accomplished, for instance, by allowing the base member to be driven by a linear motion device, which is powered by a stepper motor to provide movements along the "X," axis. As an example, schematically shown in FIG. 3 is a base member with two slots 42A,42B extending along the "X" axis and being guided by two corresponding tracks 43A,43B of a supporting base member 44. A stepper motor 41, attached to said supporting base member 44, is employed to move the base member 40 along the "X" axis. The supporting base member 44 is, in turn, provided with a second linear motion mechanism, driven by a second stepper motor to provide movements along the "Y" axis. For instance, the supporting base member 44 can be directed to slide on two parallel slots 46A,46B, extending along the "Y" axis, of another reversibly slidable base member 48. This supporting base member 48 is further provided with another drive means to provide "Z"-axis movements. Any similarly configured mechanical means can be utilized to move the member 48 reversibly in the vertical direction (along the "Z" axis). Simplistically shown at the lower portion of FIG. 3 is a protruded rail 50 (attached to, or integral with, member 48), which slides vertically on a "Z"-axis slot of a post 52. The post is connected to or integral with a sturdy base 54.

FIG. 1 shows that the nozzle 22 is supported, through an adaptor 28, by non-movable supporting means (an arm 32, a post 36, and a base 34). Alternatively, one, two, or three of the mechanical drive means can be provided to the nozzle (rather than the base member 40, or supporting base members 44,48) to effect relative movements between the base member 40 and the nozzle 22. The base member and its mechanical drive means may be supported by a sturdy base 54 with little or no vibration when the base member moves. Instead of stepper motors, many other types of drive means can be used, including linear motors, servo motors, synchronous motors, D.C. motors, and fluid motors.

Z-axis movements are effected to displace the nozzle relative to the base member and, hence, relative to each layer deposited prior to the start of the formation of each successive layer. This will make it possible to form multiple layers of impregnated tow of predetermined thickness, which build up on each other sequentially as the matrix material solidifies after discharge from the orifice. The rate at which the impregnated tow is discharged from the discharge orifice onto the base member is dictated by the linear speed of the fiber tow on the surface of the roller, which is driven by a motor. This linear speed can be adjusted, by varying the motor rotational speed, to meet the possible needs of variable rate at which the nozzle moves with respect to the base member.

As another embodiment of the present invention, the apparatus as previously defined may comprise a plurality of nozzles each having flow-passage means therein connected to a dispensing outlet at one end thereof. The dispensing outlet for each additional nozzle may comprise a tip with a discharge orifice of a predetermined size therein. Each additional nozzle is provided with a separate supply of reinforcement fibers and a matrix material, and means for introducing the reinforcement fibers and matrix material into the flow-passage so that the matrix material is in a fluid state just prior to discharge. This can be accomplished by employing a similarly configured fiber spools (giving out rovings of different fiber types or fiber counts), resin bath (containing a resin of possibly different composition), and separate sets of rollers.

Another embodiment of the present invention contains a multiple-nozzle apparatus as just described. However, at least one nozzle is supplied with a matrix material only so that this nozzle is operative to discharge a neat matrix material without a reinforcement fiber. There are many commercially available metering and dispensing nozzles that are capable of depositing thermosetting resins such as epoxy and polyurethane. Examples include various two-component dispensing devices such as PosiDot® from Liquid Control Corp. (7576 Freedom Ave., North Canton, Ohio) and Series 1125 Meter-Mix-Dispense systems from Ashby-Cross Company, Inc. (418 Boston Street, Topsfield, Mass.). Any of such prior art dispensing nozzles can be incorporated as a part of the presently invented apparatus to deposit neat resin when and where needed. Such a nozzle can serve to (1) deposit material layer by layer for building a neat resin part, (2) form pure resin zones where fiber reinforcement is not needed in an otherwise fiber reinforced structure, or (3) spray up a neat resin layer to smooth out a previously deposited impregnated tow for producing a continuous fiber reinforced composite part with an improved surface finish.

Figure 4:
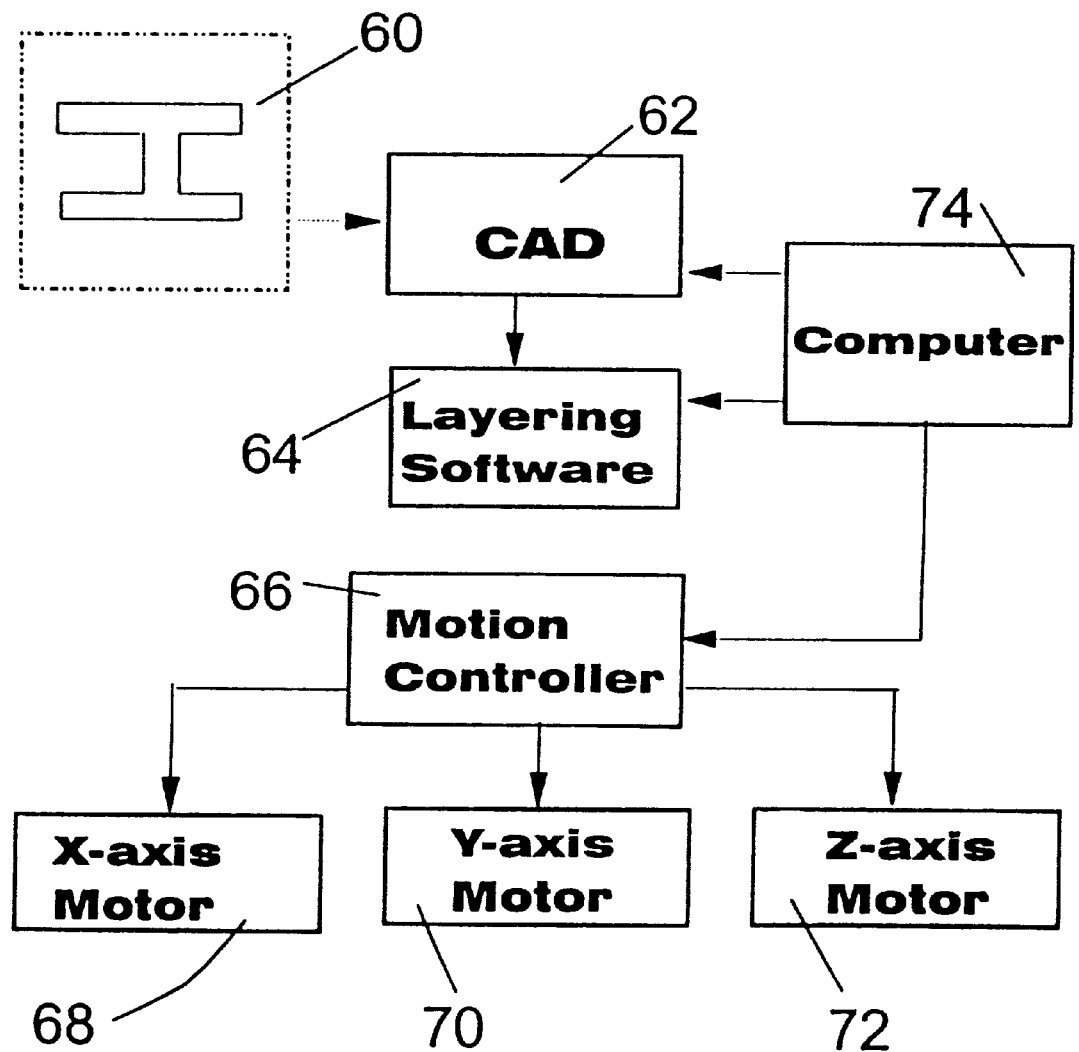
FIG. 4 A flow chart showing the sequence of creating the 3-D object by a CAD software program, establishing layer-by-layer database by layering software, and sending out motion-controlling signals by a computer to the three drive motors through a motion controller.

A preferred embodiment of the present invention contains any impregnated tow-dispensing apparatus as described in this section, but further comprising a computer-aided design (CAD) computer 74 and a motion controller 66. As schematically shown in FIG. 4, the CAD computer with its supporting software programs 62,64 operates to create a three-dimensional drawing of a desired object 60 or model and to convert the drawing into multiple elevation layer data. Specifically, the design of a three-dimensional object 60 is inputted into the computer utilizing commercially available CAD software 62. The object design is sectioned into multiple layers by a commercially available software program 64. Each layer has its own shape and dimensions. These layers, when combined together, will reproduce the complete shape of the intended object. Numerous software programs have become available that are capable of performing the presently specified functions. For example, AUTOLISP can be used to convert AUTOCAD drawings into multiple layers of specific patterns and dimensions. A company named CGI (Capture Geometry Inside, currently located at 15161 Technology Drive, Minneapolis, Minn.) provides capabilities of digitizing complete geometry of a three-dimensional object and creating multiple-layer data files.

The three-dimensional motion controller 66 is electronically linked to the mechanical drive means 68,70,72 and is operative to actuate the mechanical drive means in response to "X," "Y," "Z" axis drive signals for each layer received from the CAD computer. Controllers that are capable of driving linear motion devices are commonplace. Examples include those commonly used in a milling machine.

Figure 5:
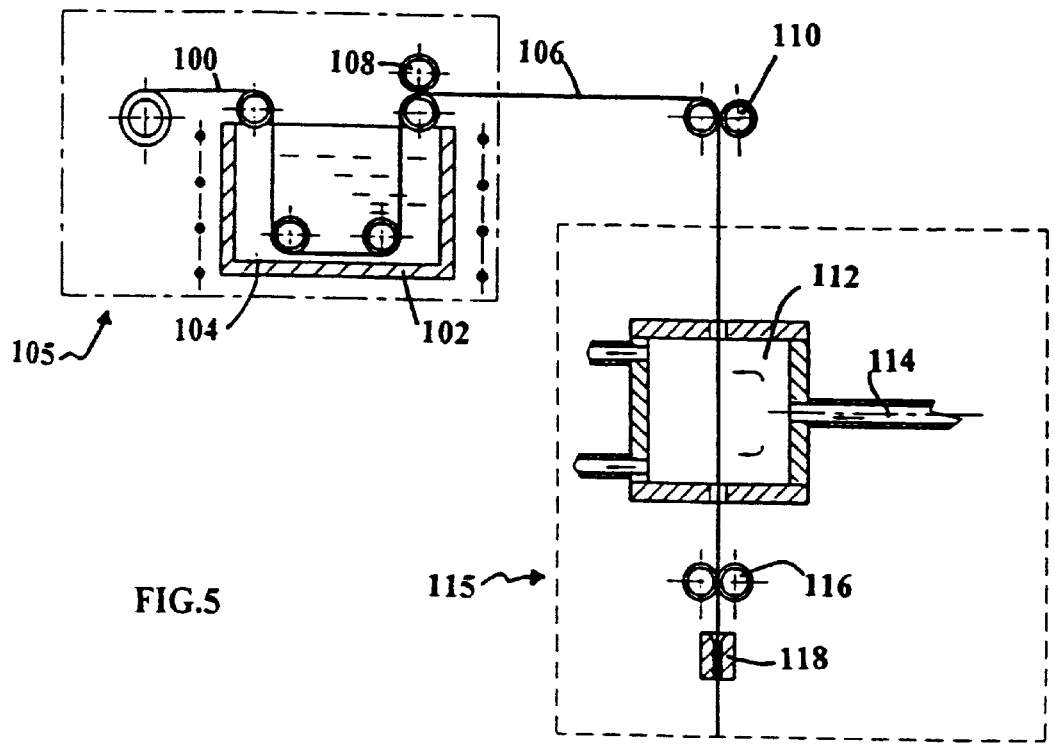
FIG. 5 Schematic of a tow-impregnating portion and solidifying-driving-guiding portion of an apparatus for making thermoplastic- or metal-matrix composite based 3-D articles.

Thermoplastic and metal matrix composite articles can also be made in a similar fashion with some modifications to the process and related apparatus (e.g., that schematically shown in FIG. 5). By utilizing a similar tow-impregnating system 105, for instance, the fiber tow 100 may be pulled through a resin bath 102 that contains either a thermoplastic melt or thermoplastic-solvent solution 104. The resin-fiber stream 106 is driven through a series of rollers (e.g. 108,110) to promote resin impregnation and fiber wet-out, and to drive off the solvent (if present). Optionally, a chemical fume hood or fume extraction device equipped with a vacuum pump may be attached to the apparatus to facilitate removal of solvent. The impregnated tow (tow-preg) then goes through an optional solidifying zone 115 that contains a chamber 112 where the resin or metal melt is cooled by a stream of cooling fluid 114. A pair of driving rollers 116 are advantageously attached underneath the solidifying zone to drive the movement of the solid-like impregnated tow. Alternatively, any of the earlier-cited rollers (e.g. 108 or 110) may be equipped with motor means to drive the movement of the tow. The tow is then moved through an optional alignment means 118 and then through a nozzle with a heating means and temperature controller to closely control the temperature of the thermoplastic resin to be slightly above the solidification temperature at the point of discharge.

Metal matrix composites can be similarly processed provided an inert atmosphere (e.g. argon gas) is introduced to prevent metal oxidation. In the case where the starting material is a bulk metal, the matrix metal is melted in a crucible. Due to the normally good electrical and thermal conductivity properties of a metal, induction heating means (instead of, or in addition to the conventional resistance heating) can be advantageously utilized to melt down the bulk metal. The fiber tow is pulled through the crucible much like the corresponding resin-impregnating operation described earlier. The impregnated tow is driven by a series of small rollers through an optional cooling zone to facilitate solidification of the metal so that excessive metal flow on the fiber surface can be avoided. The impregnated tow is directed with a guiding means, such as an alignment bushing, to move downward. Heating means is provided near the exit point of the nozzle to re-heat the metal to slightly above its melting temperature. This step acts to soften the towpreg for improved flexibility and to ready the towpreg for deposition.

Adequate time and temperature must be allowed for the matrix material to infiltrate the fiber tow and completely wet out individual fibers before the material is fully solidified. The diameters of the fiber tow and its constituent filaments must be as small as appropriate to achieve the finest unit layer thickness during the layer-by-layer operations. This is advantageous to achieving the closest dimensional tolerances and smoothest surface texture of the finished object. On the other hand, a larger-diameter tow is preferred if a high deposition rate is desired. These considerations suggest that a two-nozzle or multiple-nozzle design, separately dispensing smaller- and larger-diameter tows, is a good approach to follow.

Figure 6:
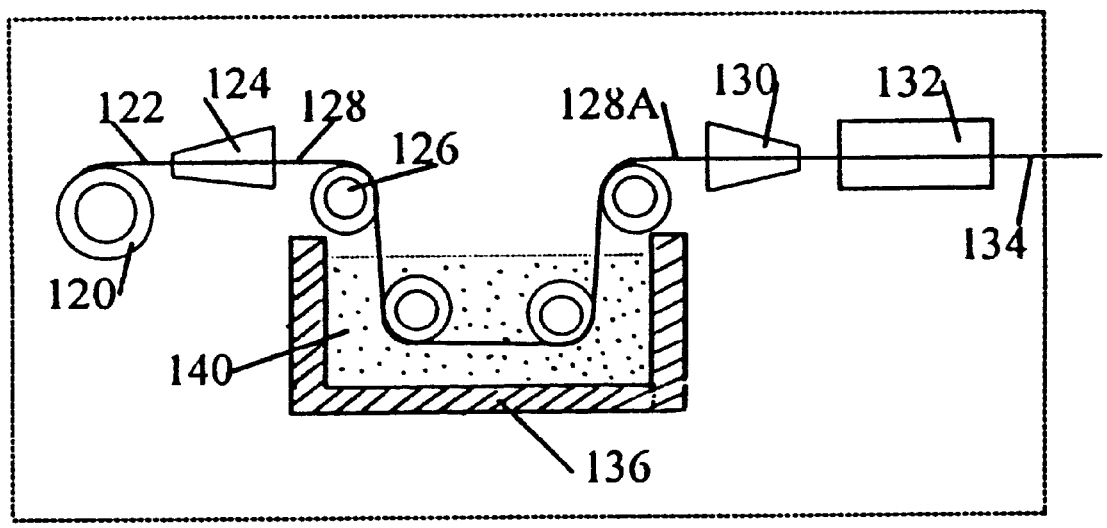
FIG. 6 A prior-art "resin slurry" technique that can be employed to produce a towpreg from fine powder particles of a matrix material.

If a matrix material is available in a fine powder form, a prior-art "resin slurry" technique can be employed to produce the towpreg. As shown in FIG. 6, this technique begins with sending the fiber tow 122 from a fiber spool 120 through a tow spreader 124 to spread and isolate individual reinforcement filaments. The tow spreader 124 is basically a chamber that is being continuously air-pumped to produce a pressure differential across the chamber for separating individual filaments. Such a prior-art tow spreader has been commonly used for preparing thermoplastic powder based towpregs in the composite materials industry.

The widely separated filaments 128 are then guided by a series of rollers (e.g. 126) and pulled through a bath 136 of slurry 140 comprising fine powder particles, a liquid medium (e.g. water), a dispersing agent, and a polymeric binder. The polymeric binder serves to tentatively glue the powder particles to the fiber surface. This binder will be burned off when the metal particles are melted to fully wet up the fiber for subsequent deposition. Preferably, in the case of resin powders, a chemically compatible binder is employed so that this binder will become incorporated in the matrix, obviating the need to burn it off. The powder-coated filaments 128A are then converged and consolidated by converging means 130 to become a towpreg. The towpreg is allowed to go through an oven 132 to drive off water and, advantageously, slightly melt the surface layer of powder particles to facilitate adhering of particles to fibers. Because the particles adhered on the fiber surface are made to be separated from one another, the towpreg 134 remains sufficiently flexible. The towpreg 134 is then driven to run through a nozzle with heating means (such as the nozzle shown in FIG. 2). This step will allow the particles to get melted and flow to cover the surface of individual fibers prior to deposition.

Figure 7:
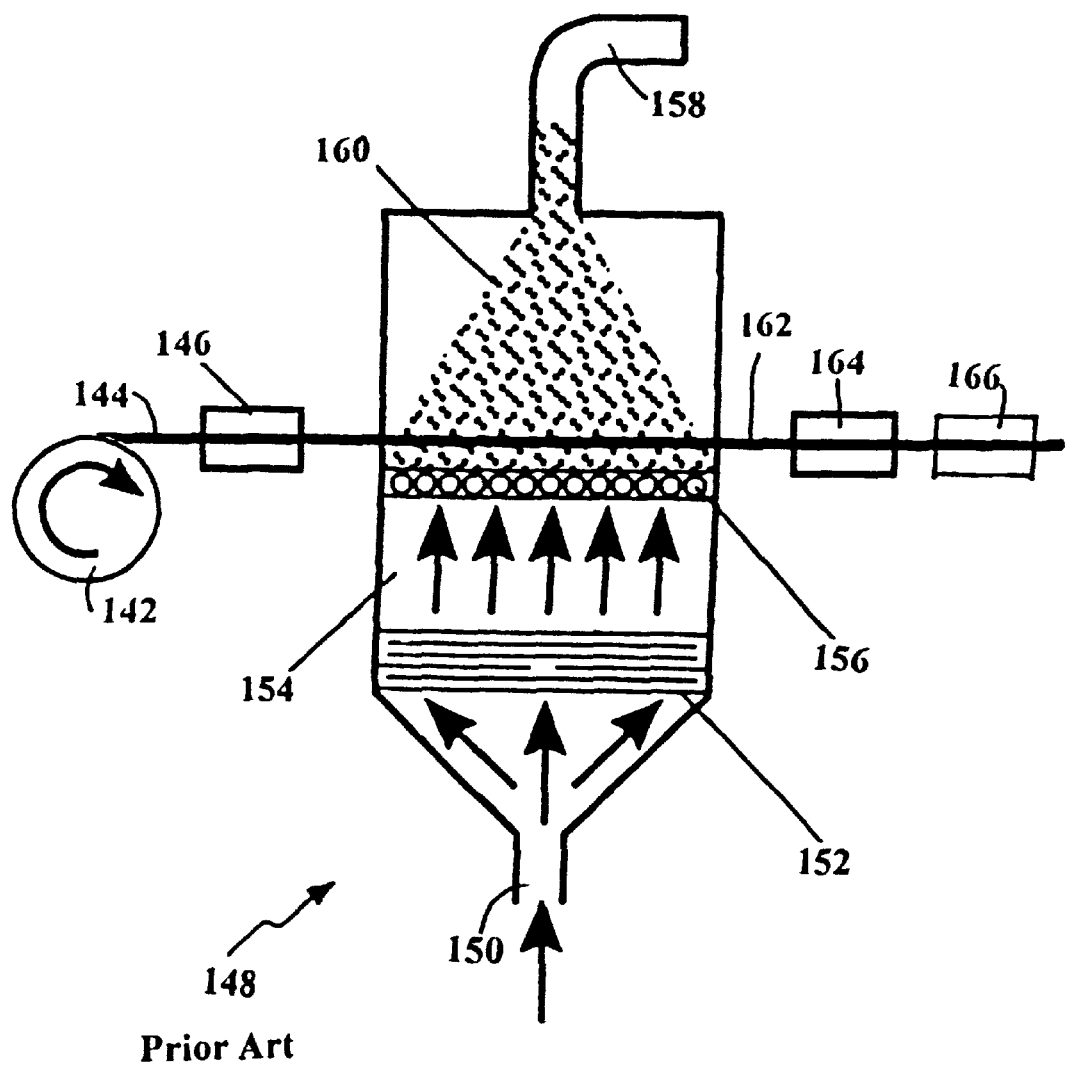
FIG. 7 A prior-art "fluidized bed" technique that can be employed to produce a towpreg from fine powder particles of a matrix material.

Another embodiment of the present invention involves utilization of a "fluidized bed" technique, instead of the "resin slurry" technique, to produce a powder-coated towpreg. An example of such a prior-art technique is illustrated in FIG. 7. The fiber tow 144 from a fiber spool 142 is driven through a tow spreader 146 to separate individual filaments, which then enter a fluidized bed 148. This fluidized bed device has an opening 150 to accept dry air from a pump. The air is directed to permeate through charging means 152 that acts to ionize air 154 and eventually provides electrostatic charges to the powder particles 160 that are coming from a second opening 158. The ionized air then migrates through a porous plate 156 that has pore sizes sufficiently large to let the air go through, yet small enough to prevent powder particles from dropping down. The air is directed to flow in such a fashion that it forces the incoming powder particles 160 to move around the upper chamber of the fluidized bed 148 where the particles come in contact with and adhere to the surface of individual fibers. The powder-coated fibers 162 are then pulled to exit the fluidized bed device and consolidated by a tow converging device 164. The towpreg is allowed to go through an oven 166 to slightly melt the surface layer of powder particles to facilitate adhering of particles to fibers. The towpreg is then driven to run through a nozzle with heating means so that the particles get melted and flow to cover the surface of individual fibers prior to deposition.

Figure 8A:
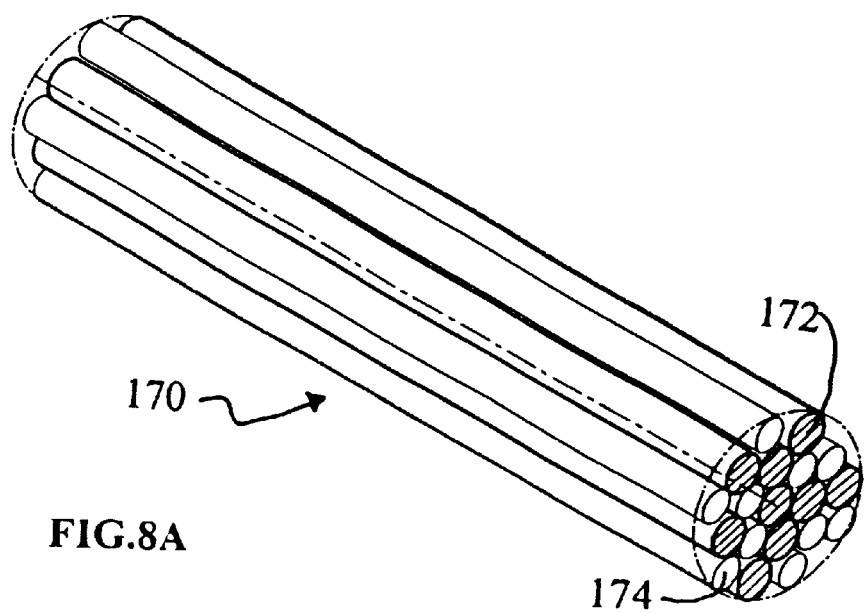
FIG. 8 (A) a commingled tow of reinforcement fibers and matrix material filaments (or wires); (B) schematic of a device for melting matrix material filaments to flow around and wet up reinforcement fibers in a commingled tow prior to deposition.
Figure 8B:
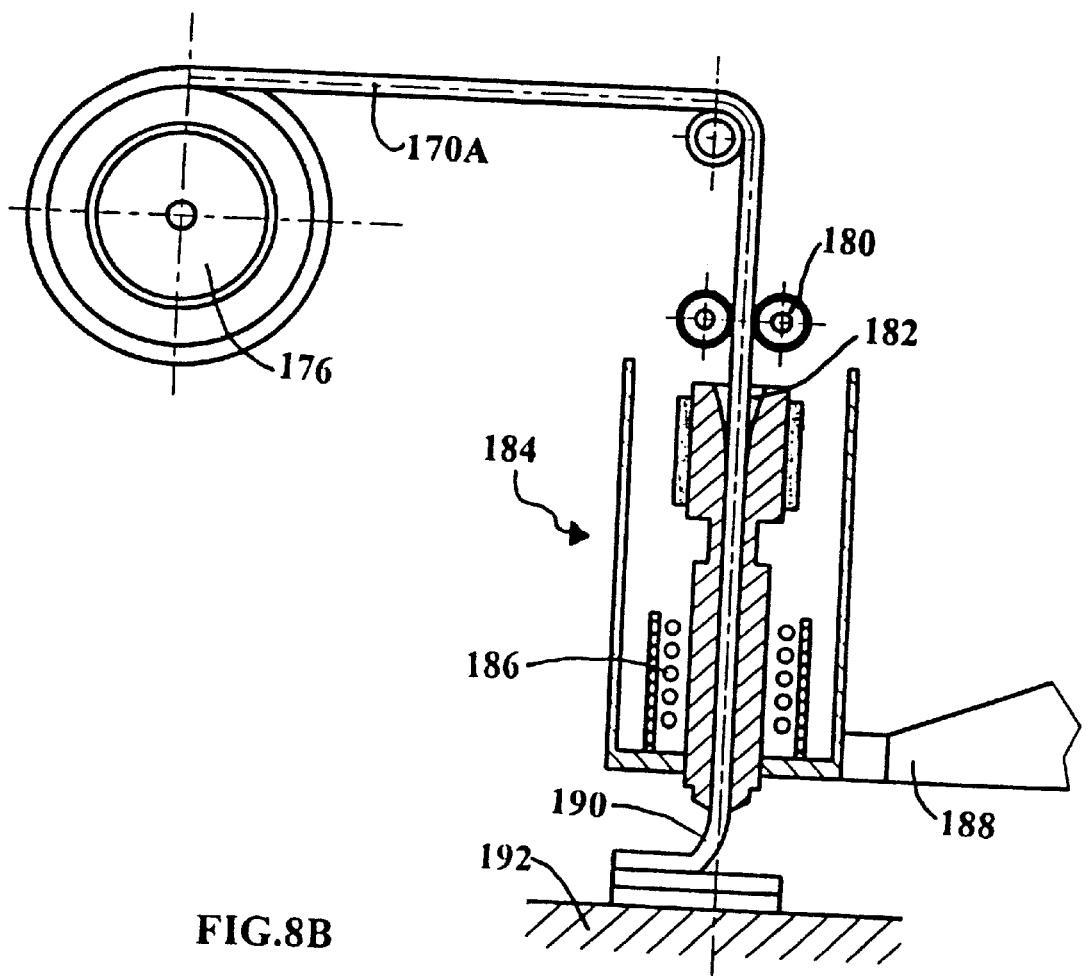

If the matrix material (thermoplastic or metal) is available in the filamentous form, then these matrix filaments 172 and the reinforcement filaments 174 can be combined to form a "commingled" tow 170 (FIG. 8A). This implies that the fiber tow 170 itself is composed of continuous reinforcement fibers and continuous matrix fibers or thin wires. Such commingled filaments 170A can be pulled concurrently, from a spool 176, by drive roller means 180 through a passage 182 of a nozzle 184, which is provided with heating means 186 (FIG. 8B). While passing through the nozzle 184, matrix filaments 172 are melted to flow around and wet up the reinforcement filaments 174 to form an impregnated tow 190. The impregnated tow is then "extruded" out of the nozzle 184 for deposition onto a base member 192. Schematically shown in FIG. 8B is but a simplified nozzle design, which is held by a supporting arm 188. Any nozzle with heating means to melt down the matrix filaments and wet up the fiber surface can be utilized.

The resin bath shown in FIG. 1 contains a resin that is pre-mixed with curing agents such as catalysts and reaction accelerators. Such a resin bath is commonly used in filament-winding and pultrusion processes for fabricating fiber reinforced resin composites. In reaction injection molding and resin transfer molding, the resin and curing agents are often contained in two separate containers. Two separate streams of fluids are then pumped from the two containers, through separate tubings, into a chamber (referred to as a mixing head) where impingement mixing occurs. The well-mixed liquid resin is then directed to flow into a mold cavity. Because the resin and its curing agents are stored separately, they will have a much longer shelf life as compared with the pre-mixed resin in a resin bath. This pre-mixed resin, if not used up in a production run, will get irreversibly cured and hardened and will have to be discarded.

Figure 9:
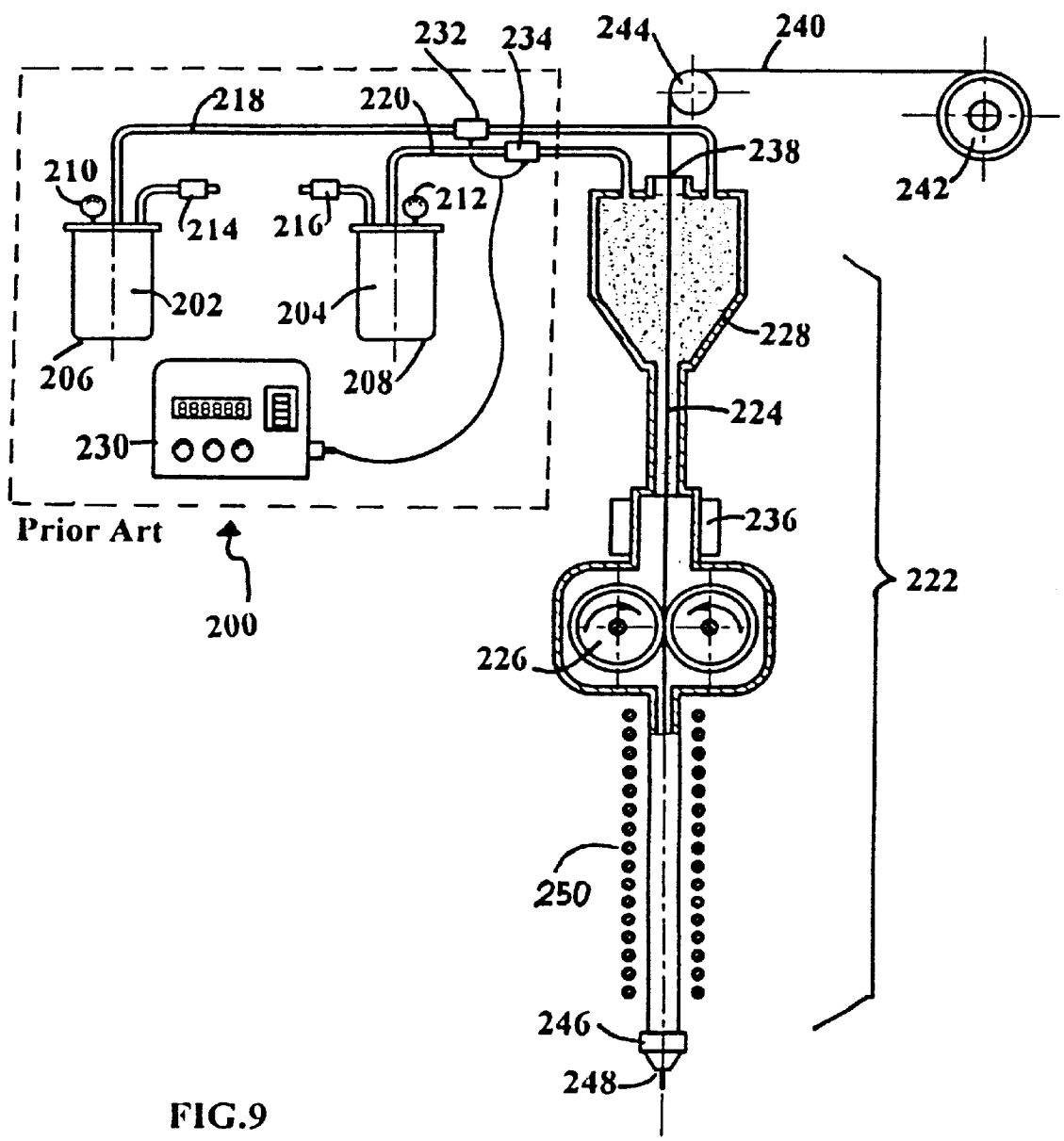
FIG. 9 A composite material-dispensing apparatus comprising a two-component thermosetting resin-dispensing device and means for impregnating a fiber tow with the matrix resin.

The prior-art dispensing devices for two-component thermosetting resins can be modified to include means for impregnating the fiber tow with a resin prior to depositing on a base member. Schematically shown in FIG. 9 is an example of such apparatus. Located on the left-handed side is a prior-art liquid-dispensing system 200 for a two-component resin. The resin 202 and its curing agents 204 are separately contained in two substantially sealed containers 206,208. The containers 206,208 are each fitted with pressure gauge means 210,212 and optional pressure release valves 214,216. Connected to and in flow-communication with the containers are flow passage means (tubings) 218, 220 that are, on the opposite ends of said tubings, in flow-communication with a chamber 228 of a dispensing head 222 to accept the two streams of liquid from the two containers 206,208. The flow rates are controlled by metering means 232,234 and controller 230. This chamber 228 is optionally equipped with pressurizing or pumping means to drive the flow of the mixed resin through a flow passage 224 of the dispensing head 222. The dispensing head 222 has an opening 238 on its top end to accept a continuous supply of reinforcement fibers 240 from a spool 242 and roller means 244. This tow of reinforcement fibers, on passing through the chamber 228 and flow passage 224, are impregnated with the mixed resin. Optional roller means 226, powered by a motor, are advantageously attached to the flow passage 224 to facilitate movements of the fiber-resin stream. Optional cooling means 236 is attached to the flow passage to rapidly cool down and tentatively solidify the resin before the resin-impregnated tow enters the area that houses rollers 226. This tentatively thermally-solidified resin-impregnated tow can be more effectively pulled by the rollers 226 as compared to a tow of fibers coated with a resin in a substantially liquid state. Optional heating means 250 (required if the resin is tentatively solidified by cooling means 236) are provided to further advance the curing reactions of the resin before the impregnated tow is pushed to go out through an orifice 248 of a nozzle tip 246 located at the bottom end of the dispensing head 222. The "extruded" tow of impregnated fibers is then ready to deposit on a base member that is equipped with movement means as described earlier.

Another preferred embodiment of the present invention is a process for making a composite material-based three-dimensional object as defined in any of the above-described processes, yet with the following additional specifications: (a) the discharge orifice tip of the nozzle has a substantially planar bottom surface being maintained at a predetermined gap distance from the base member, (b) the planar bottom surface of the tip is maintained substantially parallel to both the first layer and the plane of the base member while a second layer of preimpregnated tow is being deposited onto the first layer from the orifice. These two requirements are specified so that the planar bottom surface of the orifice tip provides a shearing effect on the top surface of the second layer to thus closely control the absolute location of successive layers with respect to the base member. The orifice acts essentially like a "doctor's blade". This action also serves to avoid any accumulative error in layer build-up, and to maintain a smooth layer surface.

There is practically an unlimited number of manners with which an impregnated tow can be directed to move. For instance, an impregnated tow may be laid up in a spiral fashion or only in one direction (e.g., +X and –X direction) until a layer or a selected area of a layer is completed. Fibers in a different region of a layer or in a different layer may be oriented along a different direction. Opportunities also exist for inserting different fiber tows at strategic locations. The type, orientation, and volume fraction of the fibers can be selected to meet the dimensional accuracy requirement (e.g., a required coefficient of thermal expansion value) and structural property requirements (e.g. strength and stiffness). This selection can be accomplished by using the CAD software that incorporates composite mechanics programs. Composite design software programs that are capable of predicting properties of a composite (given fiber orientation, properties, and proportion, and corresponding matrix properties) are widely available from various commercial sources and research institutions.

What is claimed is:

1. Apparatus for making three-dimensional, composite material-based objects of a predetermined shape by sequentially depositing multiple layers of continuous reinforcement fibers and solidifying matrix material on a base member in a desired pattern, comprising:
   (a) a movable head having flow-passage means therein connected to a dispensing outlet at one end thereof, said outlet comprising a tip with a discharge orifice of predetermined size therein;
   (b) a supply of reinforcement fibers and a matrix material, means for mixing said reinforcement fibers and matrix material to form a continuous preimpregnated tow, and means for introducing said reinforcement fibers and matrix material into said flow-passage means so that said matrix material is in a fluid state;

(c) a base member located in the close, working vicinity of said dispensing outlet of said movable head;

(d) mechanical means for moving said base member relative to said movable head in three dimensions along "X," "Y," and "Z" axes in a rectangular coordinate system in a predetermined sequence and pattern, and for displacing said movable head a predetermined incremental distance relative to said base member and thence relative to each successive layer deposited prior to the start of the formation of each successive layer to form multiple layers of said reinforcement fibers and matrix material of predetermined thickness which build up on each other sequentially as said matrix material solidifies after discharge from said orifice; and (e) means for metering the discharge of said reinforcement fibers and matrix material from said discharge orifice at a predetermined rate onto said base member to form a three-dimensional object as said base member and said movable head are moved relative to each other.

2. Apparatus as defined in claim 1 wherein;
said base member is supported for translational movement along "X" and "Y" axes in a horizontal plane; and
said mechanical means comprises motor means that are capable of selectively moving said base member along said "X" and "Y" axes.

3. Apparatus as defined in claim 1, and further comprising:
a computer-aided design computer and supporting software programs operative to create a three-dimensional drawing of a desired object or model and to convert the drawing into multiple elevation layer data; and
a three-dimensional motion controller electronically linked to said mechanical means and operative to actuate said mechanical means in response to "X," "Y," "Z" axis drive signals for each layer received from said computer.

4. Apparatus as defined in claim 1 wherein:
the size of said dispensing outlet is variably adjustable.

5. Apparatus as defined in claim 1, and further including:
a plurality of movable heads each having flow-passage means therein connected to a dispensing outlet at one end thereof, said outlet comprising a tip with a discharge orifice of predetermined size therein; and, for each additional movable head,
a separate supply of reinforcement fibers and a matrix material, and means for introducing said reinforcement fibers and matrix material into said flow-passage means so that said matrix material is in a fluid state.

6. Apparatus as defined in claim 5 wherein:
at least one movable head is supplied with a matrix material only so that said movable head is operative to discharge a neat matrix material without a reinforcement fiber.

7. Apparatus as defined in claim 1 wherein:
said supply of reinforcement fibers and matrix material is in the form of matrix material-preimpregnated fiber tow.

8. Apparatus as defined in claim 1 wherein:
said supply of reinforcement fibers and matrix material is in the form of a commingled tow comprising reinforcement fibers mixed with the matrix material in a multiple-filament form.

9. Apparatus as defined in claim 1, further including fiber impregnating means comprising:
(a) reinforcement fiber-supplying means that provides a continuous strand of reinforcement fibers;

(b) fiber movement-guiding means situated in close, working proximity to said fiber-supplying means to accept fibers therefrom;

(c) container means containing matrix material in fluid form disposed in close, working proximity to said fiber movement-guiding means so that said reinforcement fibers come in physical contact and get impregnated with said matrix material to obtain a preimpregnated fiber tow.

10. Apparatus as defined in claim 9 wherein:
said fiber movement-guiding means comprises tow-spreading means to physically separate individual fibers that constitute said continuous strand of reinforcement fibers;
said matrix material in fluid form comprises powder particles dispersed in a liquid medium through which said separate fibers pass and wherein said powder particles adhere to said fibers to form powder-coated fibers;
said fiber movement-guiding means further comprises tow-consolidating means to converge said powder-coated fibers to form a preimpregnated tow.

11. Apparatus as defined in claim 10, and further comprising:
a computer-aided design computer and supporting software programs operative to create a three-dimensional drawing of a desired object and to convert the drawing into multiple elevation layer data; and
a three-dimensional motion controller electronically linked to said mechanical means and operative to actuate said mechanical means in response to "X," "Y," "Z" axis drive signals for each layer received from said computer.

12. Apparatus as defined in claim 9 wherein:
said fiber movement-guiding means comprises tow-spreading means to physically separate individual fibers that constitute said continuous strand of reinforcement fibers;
said container means comprises a fluidized bed wherein said matrix material in the form of powder particles is driven to continuously flow around so that said particles collide with and adhere to said separate fibers while passing through said container means to form powder-coated fibers;
said fiber movement-guiding means further comprises tow-consolidating means to converge said powder-coated fibers to form a preimpregnated tow.

13. Apparatus as defined in claim 12, and further comprising:
a computer-aided design computer and supporting software programs operative to create a three-dimensional drawing of a desired object and to convert the drawing into multiple elevation layer data; and
a three-dimensional motion controller electronically linked to said mechanical means and operative to actuate said mechanical means in response to "X," "Y," "Z" axis drive signals for each layer received from said computer.

14. Apparatus as defined in claim 1, further including fiber impregnating means comprising:
(a) reinforcement fiber-supplying means that provides a continuous strand of reinforcement fibers;
(b) fiber movement-guiding means situated in close, working proximity to said fiber-supplying means to accept fibers therefrom;

(c) matrix resin delivery means disposed in close, working proximity to said fiber movement-guiding means, comprising two separate container means to contain ingredients of a matrix resin, separate tubings that are in fluid-flow communication with said container means on one end of each said tubing and in fluid-flow communication with said moveable head on the opposite end of each said tubing, flow metering means to control the flow rates of said matrix resin through said tubings, and flow control means that are electronically connected to said metering means;

said moveable head having a chamber to accommodate the matrix resin coming from said resin delivery means, said chamber being in fluid-flow communication with said flow-passage means of the moveable head; said moveable head having an opening to accept a continuous supply of said reinforcement fibers so that said reinforcement fibers come in physical contact with and get impregnated by said matrix resin to obtain a preimpregnated fiber tow.

15. Apparatus as defined in claim 14 wherein said flow-passage means is further provided with cooling means disposed substantially near the mid-point of said flow-passage means to tentatively solidify said matrix material resin on said preimpregnated tow, roller means disposed in close, working proximity to said cooling means to assist in driving the movement of said preimpregnated tow containing said tentatively solidified matrix resin, and heating means to melt down said tentatively solidified resin and to further advance the cure reactions of said resin.

16. Apparatus as defined in claim 14, and further comprising:

a computer-aided design computer and supporting software programs operative to create a three-dimensional drawing of a desired object and to convert the drawing into multiple elevation layer data; and a three-dimensional motion controller electronically linked to said mechanical means and operative to actuate said mechanical means in response to "X," "Y," "Z" axis drive signals for each layer received from said computer.

17. Apparatus as defined in claim 1 wherein:

said means for introducing said reinforcement fibers and matrix material into said flow-passage means comprises heating means disposed in the vicinity of said flow passage means to maintain said matrix material in a flowable state in said flow passage means and at said discharge orifice.

18. Apparatus as defined in claim 17 wherein:

a temperature controller is connected to said heating means and temperature-sensing means is located on said moveable head adjacent to said dispensing outlet, said temperature-sensing means being connected to said temperature controller, whereby said temperature controller works to closely regulate said heating means and thus to accurately control the temperature of said matrix material.

19. A process for making a composite material-based three-dimensional object comprising:

(a) introducing a supply of reinforcement fibers and a matrix material into a flow passage of a discharge nozzle on a moveable dispensing head, said nozzle having a dispensing outlet at one end thereof in fluid-flow communication with said flow passage;

(b) mixing said reinforcement fibers and matrix material to form a continuous preimpregnated tow and dispensing said preimpregnated tow from said dispensing outlet onto a base member positioned in the vicinity of said nozzle, said matrix material being in a predetermined physical state that permits said matrix material to readily solidify after discharge;

(c) concurrently with the dispensing of said preimpregnated tow onto said base member, mechanically effecting relative movement of said base member and said dispensing head with respect to each other in a predetermined pattern to form a first layer of said preimpregnated tow on said base member; and (d) displacing said dispensing head a predetermined layer thickness distance from said first layer, and after the portion of said first layer adjacent said nozzle has substantially solidified, dispensing a second layer of said preimpregnated tow onto said first layer from said dispensing outlet while concurrently moving said base member and said dispensing head relative to each other, whereby said second layer solidifies and adheres to said first layer; and (e) depositing multiple layers of said preimpregnated tow built up on top of each other in multiple passes by repeated dispensing of said preimpregnated tow from said dispensing outlet as said base member and said dispensing head are moved relative to each other, with said dispensing head and said base member being displaced a predetermined distance after each preceding layer is formed, and with the dispensing of each successive layer being controlled to occur after the matrix material in the preceding layer immediately adjacent to said nozzle has substantially solidified.

20. The process as defined in claim 19 wherein:

said matrix material is a thermosetting resin; and heating means is provided to accelerate the cure reactions and solidification of said resin after deposition.

21. The process as defined in claim 19 wherein:

said matrix material is a thermoplastic resin; and cooling means is provided to accelerate the solidification of said resin after deposition.

22. The process as defined in claim 19 wherein:

said matrix material is a metal.

23. A process for making a composite material-based three-dimensional object as defined in claim 19 wherein:

(a) said dispensing head having a tip with a discharge orifice therein, said tip having a substantially planar bottom surface being maintained at a predetermined gap distance from said base member;

(b) maintaining said planar bottom surface of said tip substantially parallel to both said first layer and the plane of said base member while dispensing a second layer of said preimpregnated tow onto said first layer from said orifice, whereby said tip planar bottom surface provides a shearing effect on the top surface of said second layer to thus closely control the absolute location of successive layers with respect to the base member and to avoid any accumulative error in layer build-up, and to maintain a smooth layer surface.

24. A process for making a composite material-based three-dimensional object comprising:

(a) creating a drawing of a three-dimensional object on a computer in a computer-aided design process wherein the drawing comprises a plurality of thin segments which, in combination, define said object;

(b) generating programmed signals corresponding to each of said segments in a predetermined sequence;

(c) introducing a supply of reinforcement fibers and a matrix material into a flow passage of a discharge nozzle on a moveable dispensing head, said nozzle having a dispensing outlet at one end thereof in fluid-flow communication with said flow passage;

(d) mixing said reinforcement fibers and matrix material to form a continuous preimpregnated tow and dispensing said preimpregnated tow from said dispensing outlet onto a base member positioned in the vicinity of said nozzle, said matrix material being in a predetermined physical state such that said material readily solidifies after discharge;

(e) concurrently with the dispensing of said preimpregnated tow onto said base member, and in response to said programmed signals, mechanically effecting relative movement of said base member and said dispensing head with respect to each other in a predetermined pattern to form a first layer of said preimpregnated tow on said base member; and, (f) in response to said programmed signals, displacing said dispensing head a predetermined layer thickness distance from said first layer, and after the portion of said first layer adjacent said nozzle has substantially solidified, dispensing a second layer of said preimpregnated tow onto said first layer from said dispensing outlet while concurrently moving said base member and said dispensing head relative to each other, whereby said second layer solidifies and adheres to said first layer; and (g) again in response to said programmed signals, depositing multiple layers of said preimpregnated tow built up on top of each other in multiple passes by repeated dispensing of said preimpregnated tow from said dispensing outlet as said base member and said dispensing head are moved relative to each other, with said dispensing head and said base member being displaced a predetermined distance after each preceding layer is formed, and with the dispensing of each successive layer being controlled to occur after the matrix material in the preceding layer immediately adjacent to said nozzle has substantially solidified, whereby a three-dimensional object of predetermined design is fabricated substantially layer by layer on said base member.

* * * * *

UNITED STATES PATENT AND TRADEMARK OFFICE
CERTIFICATE OF CORRECTION

PATENT NO : 5,936,861
DATED : August 10, 1999
INVENTOR(S): Bor Z. Jang, E. J. Ma, and C. J. Wang It is certified that error appears in the above-identified patent and that said Letters Patent is hereby corrected as shown below:

Column 1:
Immediately after the title of the patent, "APPARATUS AND PROCESS FOR PRODUCING FIBER REINFORCED COMPOSITE OBJECTS," add the following sentences:

This application is based in part on the results of a research project sponsored by the U.S. NASA Johnson Space Center. The U.S. government has certain rights on this invention.

Signed and Sealed this

Twenty-ninth Day of May, 2001

*Attest:*

NICHOLAS P. GODICI

*Attesting Officer*     *Acting Director of the United States Patent and Trademark Office*